US005571310A

United States Patent [19]
Nanaji

[11] Patent Number: 5,571,310
[45] Date of Patent: Nov. 5, 1996

[54] VOLATILE ORGANIC CHEMICAL TANK ULLAGE PRESSURE REDUCTION

[75] Inventor: Seifollah S. Nanaji, Greensboro, N.C.

[73] Assignee: Gilbarco Inc., Greensboro, N.C.

[21] Appl. No.: 440,312

[22] Filed: May 12, 1995

[51] Int. Cl.⁶ .................................................. B01D 61/00
[52] U.S. Cl. ..................................... 96/4; 55/217; 55/218; 55/271; 55/310; 95/12; 95/15; 95/22; 95/50; 96/6; 96/173; 96/174
[58] Field of Search ............................ 55/217, 218, 271, 55/310, 311; 95/8, 12, 14, 15, 19, 22, 23, 45, 46, 47, 50, 54; 96/4, 6, 156, 173, 174, 188

[56] References Cited

U.S. PATENT DOCUMENTS

| | | |
|---|---|---|
| 3,751,879 | 8/1973 | Allington . |
| 3,861,890 | 1/1975 | Doncer et al. . |
| 3,907,524 | 9/1975 | Haines, Jr. . |
| 4,058,373 | 11/1977 | Kurz et al. . |
| 4,101,297 | 7/1978 | Uda et al. . |
| 4,118,170 | 10/1978 | Hirt ................................................ 431/5 |
| 4,556,488 | 12/1985 | Timm et al. ........................ 210/321.1 |
| 4,670,028 | 6/1987 | Kennedy . |
| 4,673,418 | 6/1987 | Peinemann . |

(List continued on next page.)

FOREIGN PATENT DOCUMENTS

| | | |
|---|---|---|
| 0 247 585 | 12/1987 | European Pat. Off. . |
| 0443068A1 | 2/1990 | European Pat. Off. . |
| 87 02 0742 | 11/1987 | Germany . |
| 3708950A1 | 9/1988 | Germany . |
| 3806107A1 | 8/1989 | Germany . |
| 3824400A1 | 1/1990 | Germany . |
| 4142411C1 | 5/1993 | Germany . |
| 4214551A1 | 10/1993 | Germany . |
| 9205552.4 | 10/1993 | Germany . |

(List continued on next page.)

OTHER PUBLICATIONS

The Magazine for Economics, Research, Technology, Environment vol. 45, Jun., 1993.
A reprint from Separation Science and Technology Article entitled: "Engineering Aspects of the Plant Design To Separate Volatile Hydrocarbons By Vapor Permeation" by K. Ohlrogge et al. 1992.
Paper entitled "Gossler–Regas Systems" Author Unnamed–Undated.
Paper Presented at The 1993 Eleventh Annual Membrane Technology/Separations Planning Conference; Oct. 11, 12, 13, 1993 Newton, Massachusette entitled "Volatile Organic Compound Control Technology by Means of Membranes" by K. Ohlrogge.

(List continued on next page.)

Primary Examiner—C. Scott Bushey
Attorney, Agent, or Firm—Rhodes Coats & Bennett, L.L.P.

[57] ABSTRACT

An apparatus reduces the pressure in a volatile chemical tank ullage including a first conduit for connection to the volatile chemical tank ullage, a vapor extractor, a pressure sensor to detect the pressure in the volatile chemical tank ullage, a separation module having an inlet connected to the first conduit, a separation membrane, a permeate outlet separated from the inlet by the separation membrane, and a retentate outlet, a second conduit connected to the permeate outlet for connection to the volatile chemical tank, a vapor pump associated with the second conduit for creating a low pressure in the separation module near the permeate outlet as to induce selected vapors to pass through the separation membrane, a vent associated with the retentate outlet to vent retentate to atmosphere, a VOC detector to detect VOC concentrations in the vent, and a controller to receive inputs from the pressure sensor and the VOC detector and output control signals to the vapor extractor and the vapor pump to pull vapor from the ullage when the pressure exceeds a pressure threshold and return permeate to the tank and permit relatively VOC-free air to be released through the vent, thereby reducing the pressure in the ullage.

17 Claims, 3 Drawing Sheets

U.S. PATENT DOCUMENTS

| | | | |
|---|---|---|---|
| 4,788,556 | 11/1988 | Hoisington et al. | 346/1.1 |
| 4,994,094 | 2/1991 | Behling et al. | |
| 4,995,977 | 2/1991 | Hilgendorff et al. | 210/321.6 |
| 5,040,577 | 8/1991 | Pope | 141/59 |
| 5,053,058 | 10/1991 | Mitariten | 95/8 |
| 5,076,923 | 12/1991 | Hilgendorff et al. | 210/321.6 |
| 5,108,549 | 4/1992 | Wenzlaff et al. | 203/1 |
| 5,139,677 | 8/1992 | Pasternak | 210/640 |
| 5,141,649 | 8/1992 | Pasternak et al. | 210/640 |
| 5,147,550 | 9/1992 | Wijmans et al. | 210/640 |
| 5,151,190 | 9/1992 | Sieryo | 210/640 |
| 5,156,740 | 10/1992 | Brüschke | 210/490 |
| 5,160,046 | 11/1992 | Pasternak | 210/640 |
| 5,171,449 | 12/1992 | Pasternak et al. | 210/640 |
| 5,195,564 | 3/1993 | Spalding | 141/1 |
| 5,203,969 | 4/1993 | Wenzlaff et al. | 203/1 |
| 5,209,262 | 5/1993 | Carow et al. | 137/614.0 |
| 5,220,799 | 6/1993 | Lievens et al. | 95/19 |
| 5,222,532 | 6/1993 | Janssen et al. | 141/59 |
| 5,254,251 | 10/1993 | Bengtson et al. | 210/490 |
| 5,288,712 | 2/1994 | Chen | 210/640 |
| 5,333,655 | 8/1994 | Bergamini et al. | 141/59 |
| 5,334,314 | 8/1994 | Neel et al. | 210/640 |
| 5,387,378 | 2/1995 | Pintauro et al. | 264/48 |
| 5,415,196 | 5/1995 | Bryant et al. | 137/14 |
| 5,464,466 | 11/1995 | Nanaji et al. | 95/45 |
| 5,484,000 | 11/1996 | Hasselmann | 141/7 |

FOREIGN PATENT DOCUMENTS

| | | |
|---|---|---|
| 4 225 170 | 10/1993 | Germany . |
| 4214424A1 | 10/1993 | Germany . |
| 4214171A1 | 11/1993 | Germany . |
| 52-138479 | 11/1977 | Japan . |
| 1-270909 | 10/1989 | Japan . |
| 668875 | 6/1979 | U.S.S.R. . |
| 1341052 | 12/1973 | United Kingdom . |
| WO91/01177 | 2/1991 | WIPO . |
| WO01/06363 | 5/1991 | WIPO . |
| WO93/22031 | 11/1993 | WIPO . |

OTHER PUBLICATIONS

Paper presented at The 1991 Ninth Annual Membrane Technology/Planning Conference Newton, Massachusetts, Nov. 4–6, 1991 entitled "Operating Experience with Membrane Systems in GAsoline Tank Farms" by K. Ohlrogge.

Paper–Small Scale Applications To Separate Organic Vapors By Means of Membranes; K. Ohlrogge et al. GKSS–Forschungszentrum Geesthacht GmbH; Max–Planck–Strasse, D–21502 Geesthacht, Germany.

Verfahren zur Verbesserung des Absaugwirkungsgrades durch Integration eines Gastrennmoduls in die Gasrückführleitung auf Tankstellen.

Gasoline Storage Tank Farms; Bundes–Immissionsschutz–gesetzes bei der Betankung von Kraftfahrzeugen (Fassung des Kabinettbeschlusses vom 14. Aug. 1991) (No English translation); author unknown.

"Central Vapour Recovery System":; Gossler, date unknown.

"Information on State of Affairs–New Test Results" Gossler date unknown.

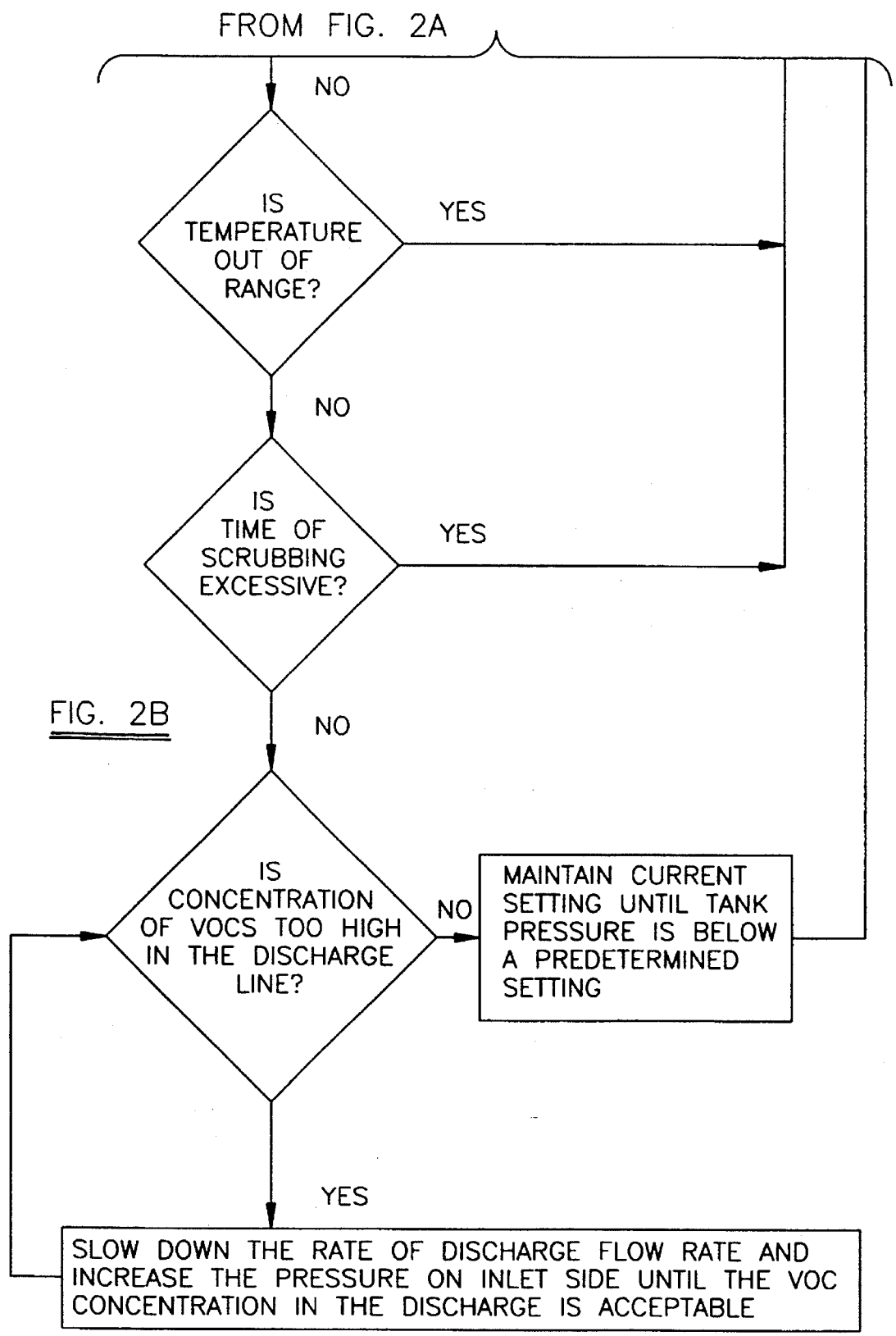

VOLATILE ORGANIC CHEMICAL TANK ULLAGE PRESSURE REDUCTION

BACKGROUND OF THE INVENTION

The present invention relates to improvements in an apparatus for reducing the pressure in the ullage of a volatile chemical tank to prevent fugitive emissions of polluting VOC vapors and to aid in the recovery of the chemical for use.

Storage tanks and piping for volatile organic chemicals (VOC's) have an area above the liquid known as the ullage, in which air and volatile chemical vapors reside. Various pressure changes can occur in the tank due to diurnal temperature changes, periodic refilling and the like, leading to an overpressure in the underground tank. These overpressures are of concern, since the result can be fugitive emissions of pollutants to the atmosphere. If pressurized, the air and volatile chemical vapors will have a tendency to leak out of any hole in the tank or piping of the system, thus allowing the release of the polluting volatile chemical vapor to the atmosphere, which is undesirable from an environmental protection point of view. It is also undesirable economically, because the material lost to the atmosphere has commercial usefulness.

The present applicant together with two co-inventors addressed the problem of fugitive emissions of fuel vapors in copending application Ser. No. 08/153,528 filed Nov. 16, 1993, now U.S. Pat. No. 5,464,466. The entire disclosure of that application is incorporated herein by reference. That prior application discloses and claims a fuel storage tank vent filter system in which vapors from the underground tanks are directed to a chamber having a membrane such as the fractionating membrane developed by GKSS-Forschungszentrum Geesthacht GmbH of Germany and described in "Operating Experiences with Membrane Systems in Gasoline Tank Farms," presented by K. Ohlrogge at the 1991 Ninth Annual Membrane Technology/Planning Conference in Newton, Mass., Oct. 4–6, 1991, or "Volatile Organic Compound Control Technology by Means of Membranes," presented by K. Ohlrogge at the 1993 Eleventh Annual Membrane Technology/Separation Planning Conference in Newton, Mass. on Oct. 11–13, 1993, the disclosures of which are hereby incorporated by reference. The membrane permits transmission of VOC's through it (permeate) in preference differentially to atmospheric vapors. That system calls for a pump to be arranged to draw the pollutants through the membrane and redirect them to the underground tank, permitting air (retentate) to be released to the vent pipe of the service station tank arrangement. Similar membranes are available from Membrane Technology and Research, Inc., Menlo Park, Calif.

While the apparatus described in my earlier application works well, it does not work optimally, and the vapors released out the vent include greater amounts of VOC vapors than are necessary or desirable. Also, my prior application does not specifically address itself to non-fuel volatile chemicals such as dry cleaning fluids and organic solvents.

Accordingly, there is a need in the art for refinement of a vent scrubber system to enhance the recovery of the VOC's in order to minimize their release to the atmosphere.

SUMMARY OF THE INVENTION

The present invention fulfills this need in the art by providing an apparatus for reducing the pressure in a volatile chemical tank ullage including a first conduit adapted to be connected to the volatile chemical tank ullage, a vapor extractor associated with the conduit for pulling vapor from the volatile chemical tank ullage, a pressure sensor adapted for mounting to detect the pressure in the volatile chemical tank ullage, and a separation module. The separation module has an inlet connected to the first conduit, a separation membrane, a permeate outlet separated from the inlet by the separation membrane, and a retentate outlet not separated from the inlet by the membrane. A second conduit is connected to the permeate outlet and adapted for connection to the volatile chemical tank, and a vapor pump associated with the second conduit creates a lower pressure in the separation module nearer the permeate outlet than near the inlet so as to induce selected vapors to pass through the separation membrane. A vent associated with the retentate outlet vents retentate to atmosphere, and a VOC detector detects VOC concentrations in the vent. A controller is included to receive inputs from the pressure sensor and the VOC detector and output control signals to the vapor extractor and the vapor pump to actuate the vapor extractor and the vapor pump to pull vapor from the ullage when the pressure exceeds a pressure threshold and return permeate to the tank and permit relatively VOC-free air to be released through the vent, thereby reducing the pressure in the ullage.

Typically, the second conduit extends to a portion of the tank below the ullage. Preferably, the apparatus also includes a vent stack associated with the first conduit and has a pressure relief valve set to open if a pressure substantially in excess of the pressure threshold is reached in the ullage.

The vapor extractor may be a variable speed pump. Alternatively, the vapor extractor may be a constant speed pump and a proportional flow control valve associated with the first conduit controls the vapor flow rate through the first conduit. Or, the vapor extractor may be a constant speed pump and a solenoid valve associated with the first conduit controls the vapor flow rate through the first conduit. Other suitable controllable extractors could be used.

The apparatus may include a discharge valve associated with the retentate outlet with the controller adapted to output a control signal to the discharge valve to open the valve to permit controlled release of relatively VOC-free air through the vent. The discharge valve may be a solenoid valve or a proportional valve.

In one embodiment the controller includes a routine to control the vapor extractor to extract vapor from the tank ullage at a slower rate than the maximum achievable by the extractor, to provide a long residence time for VOC vapor molecules adjacent the separation membrane and thereby increase the movement of VOC molecules from the retentate to the permeate.

The apparatus may include a temperature sensor downstream of the vapor extractor and associated with the controller to input a sensed temperature to the controller, with the controller having a routine to halt vapor extraction by the vapor extractor if an undesirable temperature rise is sensed.

The apparatus may include a temperature sensor downstream of the vapor pump and associated with the controller to input a sensed temperature to the controller, and the controller having a routine to halt vapor extraction by the vapor extractor if an undesirable temperature rise is sensed.

The apparatus may include a flow sensor associated with the retentate outlet and providing flow signals to the controller. If so, the controller may include a routine to monitor the rate of discharge through the retentate outlet and to halt vapor extraction by the vapor extractor if the monitored rate of discharge indicates a malfunction.

The apparatus may include a timer associated with the controller and a routine to monitor the duration of vapor extraction and to halt vapor extraction by the vapor extractor if the duration indicates a malfunction.

In an alternate embodiment the invention provides an apparatus for reducing the pressure in a volatile chemical tank ullage including a first conduit adapted to be connected to the volatile chemical tank ullage, a vapor extractor associated with the conduit for pulling vapor from the volatile chemical tank ullage, a pressure sensor adapted for mounting to detect the pressure in the volatile chemical tank ullage, and a separation module. The separation module has an inlet connected to the first conduit, a separation membrane, a permeate outlet separated from the inlet by the separation membrane, and a retentate outlet not separated from the inlet by the membrane. A second conduit connected to the permeate outlet is adapted for connection to the volatile chemical tank, and a vapor pump associated with the second conduit creates a lower pressure in the separation module near the permeate outlet than near the inlet so as to induce selected vapors to pass through the separation membrane. A vent associated with the retentate outlet vents retentate to atmosphere. A controller receives inputs from the pressure sensor and outputs control signals to the vapor extractor and the vapor pump to actuate the vapor extractor and the vapor pump to pull vapor from the ullage when the pressure exceeds a pressure threshold, return permeate to the tank and permit relatively VOC-free air to be released through the vent. The controller includes a control routine that tracks the rate of decrease of pressure in the volatile chemical tank ullage and outputs the control signals in a fashion to cause the rate of decrease of pressure in the volatile chemical tank ullage to be less than the maximum of which the vapor extractor and vapor pump are capable, thereby reducing the pressure in the ullage.

The invention also provides a method for reducing the pressure in a volatile chemical tank ullage including detecting the pressure in the volatile chemical tank ullage, withdrawing vapor from the volatile chemical tank ullage when the detected pressure exceeds a pressure threshold, directing the withdrawn vapor to a first side of a separation membrane, creating a lower pressure on the second, downstream side of the separation membrane so as to induce selected vapors to permeate through the separation membrane, returning the permeate to the volatile chemical tank, permitting the escape of retentate from adjacent the first side of the separation membrane to atmosphere, detecting VOC concentrations in the retentate, and controlling the rate of the vapor withdrawing step to control the concentration of VOC's in the retentate to maintain such concentration at a very low level (e.g. 2% to 5%).

The withdrawing step may include pumping vapor from the volatile chemical tank and the controlling step may be carried out as controlling the rate at which vapor is pumped. Controlling the rate at which vapor is pumped may occur by controlling the opening of a proportional flow control valve, by controlling the opening of a solenoid valve, or by controlling the rate of pumping of a variable speed pump.

The step of permitting the escape of retentate from adjacent the first side of the separation membrane may include controlling the opening of a control valve for the retentate to permit controlled release of relatively VOC-free air to atmosphere.

The controlling step may include withdrawing vapor from the volatile chemical tank ullage at a known rate which is slower than the maximum achievable, to provide a long residence time for VOC vapor molecules adjacent the separation membrane and thereby increase the separation of VOC molecules from the retentate to the permeate.

The method may include sensing temperature upstream of the tank and halting vapor withdrawal if an undesirable temperature rise is sensed. It may also include sensing the flow of discharged retentate and halting vapor withdrawal if the monitored rate of retentate discharge indicates a malfunction or monitoring the duration of vapor withdrawal and halting vapor withdrawal if the duration indicates a malfunction.

Instead of controlling the pumping in dependence on sensed VOC vapors in the retentate, the method may focus on the rate of decay of pressure in the ullage. The method thus would include in the controlling step tracking the rate of decrease of pressure in the volatile chemical tank ullage to cause the rate of decrease of pressure in the volatile chemical tank ullage to be less than the maximum possible, thereby providing a long residence time for VOC vapor molecules adjacent the separation membrane and increasing the separation of VOC molecules from the retentate to the permeate.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

The present invention focuses on improvements to my prior invention to increase the portion of VOC's which will pass the separation membrane out of the vapor taken from an underground tank so as to leave the retentate which does not pass through the membrane relatively free of the volatile organic compounds and VOC's of the volatile chemical.

Figure 1:
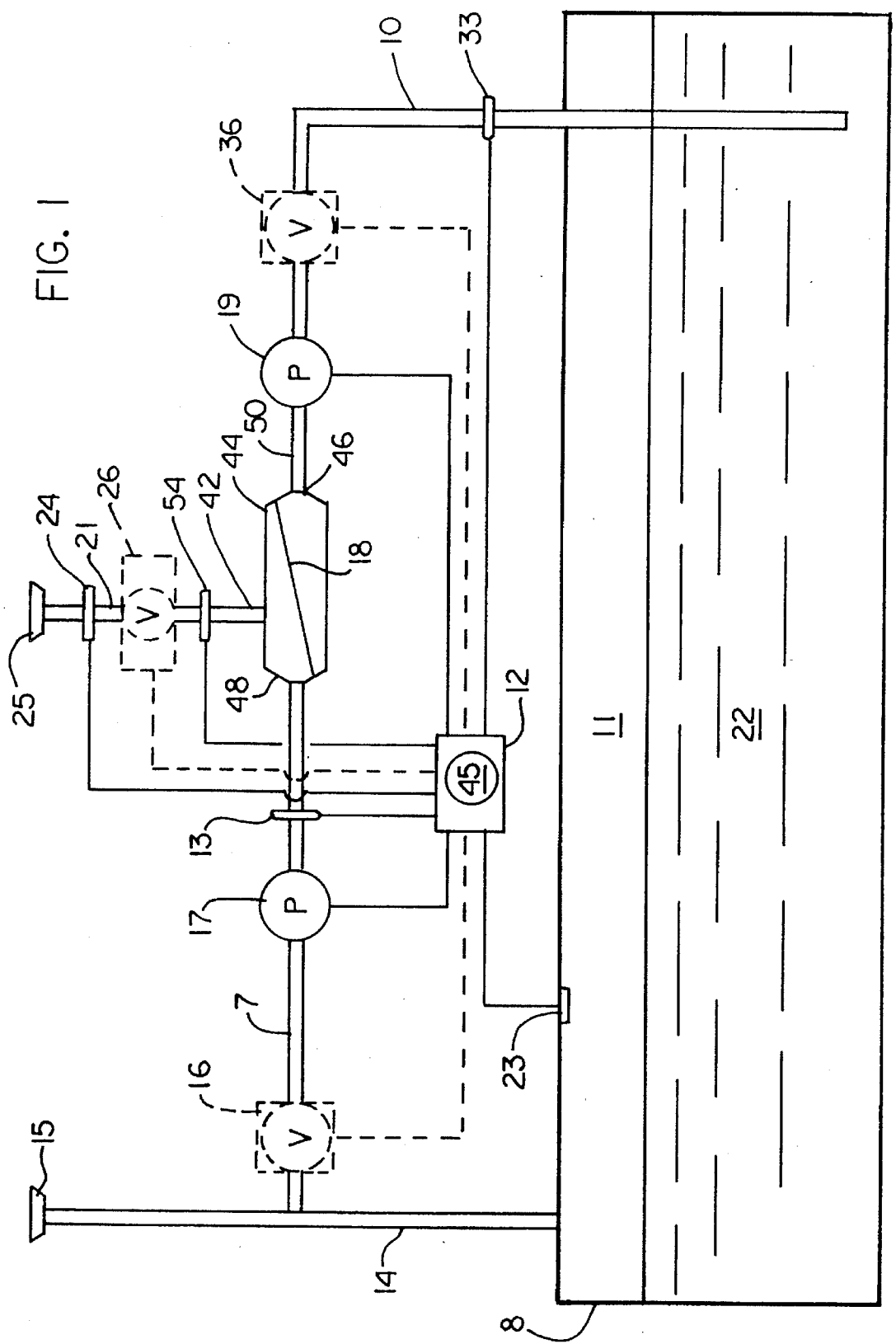
FIG. 1 is a schematic view of the components of a preferred embodiment of the invention.

Referring now to FIG. 1, there is shown a storage tank 8 which is typically underground, but need not be an underground tank for purposes of this invention. The tank 8 holds a liquid volatile chemical 22 such as dry cleaning fluid or any other suitable organic compound. Preferred embodiments of the present invention are capable of dealing with the following chemicals, at a minimum:

AROMATICS
    Benzene
    Toluene
    Xylene
ALCOHOL
    Isopropanol
    Methanol
HYDROCARBONS
    Carbon Tetrachloride
    CFC-11
    CFC-12
    CFC-113
    HCFC-123
    HFC-134a
    Methyl Bromide
    Methylene Chloride
    Perchloroethylene 1,1,1-Trichloroethane
Trichloroethylene
Vinyl Chloride
KETONES
  Acetone
  Methyl Ethyl Ketone
ALIPHATIC HYDROCARBONS
  Butane
  Hexane
  Octane Above the liquid 22 in the tank 8 is a volume 11 known as the ullage holding vapor within the tank 8. The contents of the ullage 11 will be vapors of the liquid volatile chemical 22 and, typically, air. The air arrives in the tank 8 through numerous possible paths. For example, air might be ingested through pressure vacuum valve 15 atop vent pipe 14. If the pressure in the ullage 11 falls to a low level, the pressure vacuum valve 15 opens in conventional fashion to permit air to be ingested and avoid potentially dangerous underpressure in the tank 8.

As depicted in FIG. 1, the vent pipe 14 forms part of a conduit 7 leading from the ullage 11 to the variable speed vapor pump 17. At the end of the conduit 7 is a membrane module 44. The membrane module 44 has an inlet 48 to the intake conduit 7 and a permeate outlet 46 and a retentate outlet 42. A VOC fractionating membrane 18 like those discussed above divides the module 44 so that the inlet 48 and retentate outlet 42 are on one side of the membrane 18, and the permeate outlet 46 is on the opposite side of the membrane. The outlet 46 communicates through a second conduit 50 to a vacuum pump 19 and then back to the storage tank 8. Note that the return conduit 50 extends low into the tank 8 so that its outlet may be submerged in the liquid 22. Outlet 42 has the vent pipe 21 connected to release air to atmosphere and thus reduce the volume of vapor and, hence, the pressure. At the end of the exhaust pipe 21, a pressure vacuum valve 25 like pressure vacuum valve 15 may be provided.

Affixed to the tank 8 is a pressure sensor 23 to monitor the pressure within the tank. It outputs a pressure signal to an electronic controller 12. The controller 12 can be a suitable controller such as a programmable controller or other microprocessor based control. Other suitable analog or digital electrical, pneumatic, hydraulic or fiber optic based controller may be substituted. The controller 12 has outputs to the vapor pump 17 and vacuum pump 19.

By providing pumps 17 and 19 on the two sides of the fractionating membrane 18, the control over the vapor coming through the first conduit 7 can be increased so that the permeate of VOC's through the membrane 18 for return to the tank 8 is increased greatly over the prior technology. This is accomplished by further providing a VOC sensor 54 on the retentate exhaust pipe 21. The output of the sensor 54 is fed to the controller 12.

In operation, the system just described operates as follows: the electronic control 12 through the pressure gauge 23 monitors the pressure in tank 8. When the pressure exceeds a threshold, the electronic control 12 turns on the variable speed vapor pump 17 and vacuum pump 19. Typically, the vacuum pump 19 draws down a very low vacuum on the downstream side of the membrane 18. Pressure differentials of an atmosphere across the membrane 18 are useful. The pump 17 provides the vapor to the proximity of the membrane 18 through which the VOC's can be drawn under the action of the vacuum pump 19. The components of the vapor that do not pass through the membrane are retained in module 44 and are available to pass up the exhaust pipe 21 in proximity to the VOC sensor 54. The VOC sensor 54 evaluates the proportion of VOC's in the exhausted gas and applies a signal indicative of same to the electronic control 12, which compares that signal with a predetermined threshold. If the VOC content of the exhausted retentate exceeds a desired level, the electronic controller 12 modifies the signal to the variable speed pump 17 to slow its pumping. This permits the vapor passing through the path of the pump 17 and up the stack 21 to have a higher residence in proximity to the membrane 18 and increases the likelihood that the VOC vapor components will pass through the membrane 18 for return to the tank 8. The monitoring of the VOC's in the exhausted retentate continues and is used as a feedback signal to modulate the pumping rate of the variable speed pump 17. Preferably, the pump 19 is left on for a period of time after pump 17 is turned off. This will permit any residual VOC vapors that are attracted to but not yet passed through the membrane to be induced to pass through the membrane.

The vapor returned to the tank then can recondense and be available for reuse. The invention thus provides both environmental advantages and commercial advantages.

Also shown in FIG. 1 are various additional or alternate components. For example, a solenoid or proportional valve 16 may be provided in series with the vapor pump 17. In this instance, the pump 17 need not be a variable speed pump, but could be a constant speed pump and the rate of vapor passage through the pump may be modulated by control of the valve 16. If valve 16 is a proportioning valve, the amount of opening of the proportional valve would be controlled by the electronic control 12 to achieve the same results described above. If the valve 16 is a solenoid valve, it is opened and closed under the control of controller 12 so as to have an "open" duty cycle suitable for the desired flow rate. The controllable pumping of the vapor is thus performed by a vapor extractor.

Also in the first conduit 7 leading to the inlet 48 of the separation module 44 is a temperature sensor 13. The temperature sensor 13 reads the temperature of the vapor exiting the pump 17 and passes a temperature signal to controller 12. If a temperature rise indicative of excessive heating of the vapor by the pump 17 is noted, the controller 12 can take appropriate action, such as shutting down the scrubber altogether. Such excessive heating may be determined by a temperature exceeding a threshold or by the rate of rise exceeding a threshold.

In addition, the second conduit 50 may be provided with a solenoid or proportional valve 36 operating in conjunction with the vacuum pump 19 to modulate the flow through the second conduit 50 as described above with respect to the valve 16.

The valves 16 and 36 and their associated control lines to the electronic control are shown in phantom in FIG. 1 to show that these are optional possible designs.

A further option is to provide a solenoid or proportional valve 26 in the exhaust stack 21, also under the control of controller 12. The solenoid or proportional valve 26 can be used to provide further control over the vapor on the upstream side of the membrane 18 to further increase the vapor's residence time in proximity to the membrane. The valve 26 can be used to "choke" the discharge from the membrane module 44 and simply prevent the escape of VOC's vapors at too fast a rate, and thereby increase the residence time.

The exhaust stack 21 can also be provided with an exhaust flow rate sensor 24 providing an input signal back to the electronic control 12 as a safety diagnostics feature. The flow rate sensor 24 can be used to monitor the flow rate of the retentate out the exhaust stack and signal a malfunction if the flow rate falls outside a predetermined expected range and thereby shut down the scrubber operation for safety reasons.

Finally, a temperature sensor 33 may be provided in the second conduit 50 downstream of the vacuum pump 19 to operate like the aforementioned temperature sensor 13 with respect to the first inlet conduit to the membrane module.

Figure 2A:
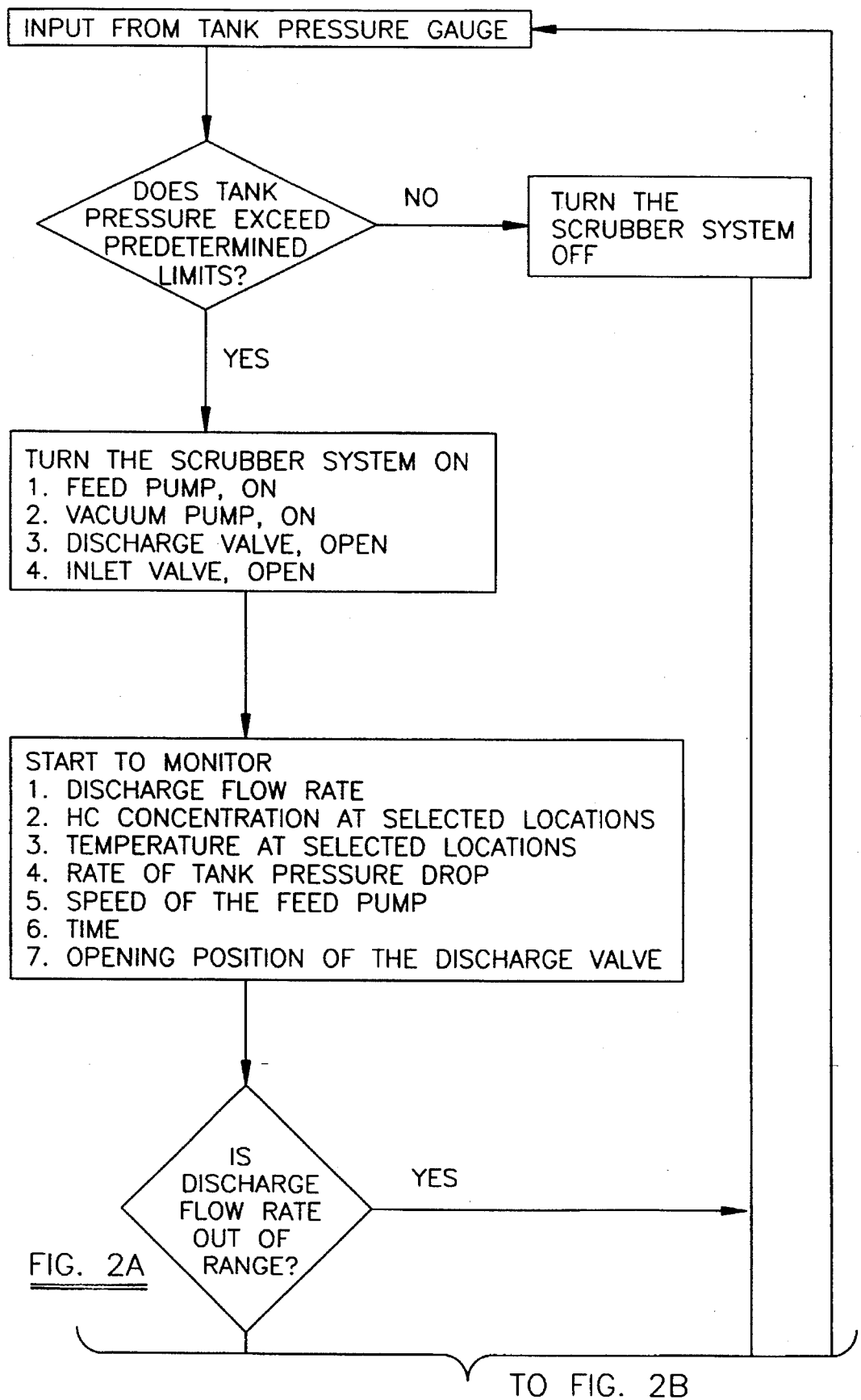
FIG. 2 is a flow chart showing the processing of the apparatus depicted in FIG. 1.

Referring now to FIG. 2, the processing of the apparatus can be seen in flow chart form, starting at the top of the figure. The flow chart includes a full set of diagnostics routines complementing the full set of options shown in FIG. 1.

Starting at the top of the figure, the pressure from pressure gauge 23 is read and compared to a predetermined limit by controller 12. If the pressure does not exceed a predetermined limit, then the controller 12 keeps the scrubber system turned off. If it exceeds the determined limit, the scrubber system is turned on by turning on the pump 17, and the vacuum pump 19, opening the discharge valve 26, if present, and opening the inlet valve 16, as well as valve 36, should they be present. This pumping by the pumps 17 and 19 will extract vapors from the ullage 11 and deliver them to proximity with the membrane 18. The pump 19 will pull the VOC components of the vapor through the membrane 18 and return them to the tank 8 through conduit 50. The vapors that do not pass through the membrane 18 will pass out of the stack 21.

At the same time, the electronic control 12 will begin to monitor the discharge flow rate read from the flow sensor 24, the VOC concentration as measured by the VOC sensor 54, and the temperature as read by the temperature sensors 13 and 33. The electronic control 12 has an internal timer 45 which can be used for several purposes. First, it can measure the rate of the pressure drop in the tank 8 by comparing the readings from the pressure sensor 23 over time and gauge the effectiveness of the operation by the rate of pressure drop. In fact, one useful control method for the controller 12 can be to focus on the rate of pressure drop, even to the exclusion of the VOC concentration sensed by the VOC sensor 54.

The time of the entire operation from the beginning of the turning on of the scrubber system can also be monitored to see that it does not exceed a predetermined threshold. Obviously, if the reduction in pressure should only take five minutes under normal conditions, but the scrubber has continued to operate for, say, ten minutes, it can be ascertained that a problem has occurred and the system can be shut down by controller 12.

Finally, the opening position of the discharge valve 26 can be monitored to provide data from which the rate of discharge of retentate can be ascertained. The speed of the feed pump 17 can also be measured to ascertain the rate at which the vapor is being addressed to the membrane 18.

From the monitored values, four decision blocks are encountered. These need not be in the order given in the flow chart in FIG. 2. If the discharge flow rate sensed by the flow sensor 24 is out of range as determined by the controller 12, then it can be ascertained that a malfunction has occurred and shut the scrubber down. Similarly, if the temperature sensed by sensor 13 or 33 is out of range, the scrubber system can be turned off. As noted above, if the period during which the scrubbing system is on is excessive, the scrubber system can be turned off.

If none of these have occurred, the VOC concentration measured by the VOC sensor 54 is evaluated. If it is above a predetermined threshold, then it can be ascertained that the vapors from the first conduit into the module 44 and up the vent stack 21 are moving too fast and should be retarded to increase their residence time in proximity to the membrane 18. The rate of the discharge is thus slowed by closing valve 26 more and/or the pumping rate on the inlet side of the membrane 18 is decreased until the concentration of VOC's determined by the VOC sensor 54 is acceptable.

The rate of discharge and inlet pressure can be modulated in several fashions, as suggested above. If the system is equipped with a discharge valve 26, whether it be proportional or solenoid, the amount of opening can be decreased, so as to limit the rate of escape of retentate and thereby increase its residence time in proximity to membrane 18.

Alternatively, the pump 17 can be slowed so that the delivery of vapor to the upstream side of the membrane 18 is decreased and thereby increase the residence time of the vapor in proximity to that membrane. Of course, the equivalent of slowing of variable speed pump 17 by reducing the opening of a proportional or solenoid valve 16 in series with a constant speed pump may also be directed by the electronic control 12.

In the case of the presence of both a controllable discharge valve 26 and a variable speed pump 17 (or the equivalent constant speed pump and variable valve 16), a third control option can be implemented by controller 12. The pump 17 can be speeded up to increase the delivery of vapor to the upstream side of the membrane 18, while the valve 26 is reduced. This is particularly useful for a proportional type discharge valve as 26. The effect of increasing the feed rate through pump 17 and decreasing the flow through discharge valve 26 will be to increase the pressure in a membrane module 44 on the inlet side of the membrane 18. That increase in pressure will increase the pressure differential across the membrane 18 and thereby increase the flow of VOC molecules through the membrane to the permeate side for delivery to the tank 8.

Those of ordinary skill in the art will appreciate that there are various modifications to the precise components described above which can be made to the system and still fall within the scope of the invention.

What is claimed is:

1. An apparatus for reducing the pressure in a volatile chemical tank ullage comprising
   a first conduit adapted to be connected to the volatile chemical tank ullage,
   a vapor extractor associated with said first conduit for pulling vapor from the volatile chemical tank ullage,
   a pressure sensor adapted for mounting to detect the pressure in the volatile chemical tank ullage,
   a separation module having
     an inlet connected to said first conduit,
     a separation membrane in said module,
     a permeate outlet separated from said inlet by said separation membrane, and
     a retentate outlet not separated from said inlet by said membrane,
   a second conduit connected to said permeate outlet and adapted for connection to the volatile chemical tank for returning permeate to the tank,
   a vapor pump associated with said second conduit for creating a lower pressure in said separation module near said permeate outlet than near said inlet so as to induce selected vapors to pass through said separation membrane,
   a vent associated with said retentate outlet to vent retentate to atmosphere, a VOC detector to detect VOC concentrations in said vent, and a controller arranged to receive inputs from said pressure sensor and said VOC detector and arranged to send output control signals to said vapor extractor and said vapor pump to actuate said vapor extractor and said vapor pump to pull vapor from the ullage when the pressure exceeds a pressure threshold and return permeate to the tank and permit relatively VOC-free air to be released through said vent, thereby reducing the pressure in the ullage.

2. An apparatus as claimed in claim 1 wherein said second conduit extends to a portion of the tank below the ullage.

3. An apparatus as claimed in claim 1 further including a vent stack associated with said first conduit and having a pressure relief valve thereon set to open if a pressure substantially in excess of the pressure threshold is reached in the ullage.

4. An apparatus as claimed in claim 1 wherein said vapor extractor is a variable speed pump.

5. An apparatus as claimed in claim 1 wherein said vapor extractor comprises a constant speed pump and a proportional flow control valve associated with said first conduit to control the vapor flow rate through said first conduit.

6. An apparatus as claimed in claim 1 wherein said vapor extractor comprises a constant speed pump and a solenoid valve associated with said first conduit to control the vapor flow rate through said first conduit.

7. An apparatus as claimed in claim 1 further comprising a discharge valve associated with said retentate outlet and wherein said controller is arranged to send an output control signal to said discharge valve to open said valve to permit controlled release of relatively VOC-free air through said vent.

8. An apparatus as claimed in claim 7 wherein said discharge valve is a solenoid valve.

9. An apparatus as claimed in claim 7 wherein said discharge valve is a proportional valve.

10. An apparatus as claimed in claim 1 wherein said controller includes a routine to control said vapor extractor to extract vapor from said tank ullage at a slower rate than the maximum achievable by said extractor, to provide a long residence time for VOC vapor molecules adjacent said separation membrane and thereby increase the separation of VOC molecules from the retentate to the permeate.

11. An apparatus as claimed in claim 1 further comprising a temperature sensor downstream of said vapor extractor and associated with said controller to input a sensed temperature to said controller, and said controller having a routine to halt vapor extraction by said vapor extractor if an undesirable temperature rise is sensed.

12. An apparatus as claimed in claim 1 further comprising a temperature sensor downstream of said vapor pump and associated with said controller to input a sensed temperature to said controller, and said controller having a routine to halt vapor extraction by said vapor extractor if an undesirable temperature rise is sensed.

13. An apparatus as claimed in claim 1 further comprising a flow sensor associated with said retentate outlet and providing flow signals to said controller and wherein said controller includes a routine to monitor the rate of discharge through said retentate outlet and to halt vapor extraction by said vapor extractor if the monitored rate of discharge indicates a malfunction.

14. An apparatus as claimed in claim 1 further comprising a timer associated with said controller and wherein said controller includes a routine to monitor the duration of vapor extraction and to halt vapor extraction by said vapor extractor if the duration indicates a malfunction.

15. An apparatus for reducing the pressure in a volatile chemical tank ullage comprising a. a first conduit adapted to be connected to the volatile chemical tank ullage, b. a vapor extractor associated with said first conduit for pulling vapor from the volatile chemical tank ullage, c. a pressure sensor adapted for mounting to detect the pressure in the volatile chemical tank ullage, d. a separation module having
  1) an inlet connected to said first conduit,
  2) a separation membrane in said module,
  3) a permeate outlet separated from said inlet by said separation membrane, and
  4) a retentate outlet not separated from said inlet by said membrane, e. a second conduit connected to said permeate outlet and adapted for connection to the volatile chemical tank for returning permeate to the tank, f. a vapor pump associated with said second conduit for creating a lower pressure in said separation module near said permeate outlet than near said inlet so as to induce selected vapors to pass through said separation membrane, g. a vent associated with said retentate outlet to vent retentate to atmosphere, h. a discharge valve associated with said retentate outlet, i. a VOC detector to detect VOC concentrations in said vent, j. a controller
  1) arranged to receive inputs from said pressure sensor and said VOC detector and
  2) arranged to send output control signals to
    a) said vapor extractor to control said vapor extractor to extract vapor from said tank ullage at a slower rate than the maximum achievable by said extractor to provide a long residence time for VOC vapor molecules adjacent said separation membrane,
    b) said vapor pump to actuate said vapor pump and
    c) said discharge valve to open said discharge valve
  3) in order to pull vapor from the ullage when the pressure exceeds a pressure threshold and return permeate to the tank and permit relatively VOC-free air to be released through said vent, thereby reducing the pressure in the ullage.

16. An apparatus for reducing the pressure in a volatile chemical tank ullage comprising a first conduit adapted to be connected to the volatile chemical tank ullage, a vapor extractor associated with said first conduit for pulling vapor from the volatile chemical tank ullage, a pressure sensor adapted for mounting to detect the pressure in the volatile chemical tank ullage, a separation module having
  an inlet connected to said first conduit,
  a separation membrane in said module,
  a permeate outlet separated from said inlet by said separation membrane, and
  a retentate outlet not separated from said inlet by said membrane, a second conduit connected to said permeate outlet and adapted for connection to the volatile chemical tank for returning permeate to the tank, a vapor pump associated with said second conduit for creating a lower pressure in said separation module near said permeate outlet than near said inlet so as to induce selected vapors to pass through said separation membrane, a vent associated with said retentate outlet to vent retentate to atmosphere, and a controller arranged to receive inputs from said pressure sensor and arranged to send output control signals to said vapor extractor and said vapor pump to actuate said vapor extractor and said vapor pump to pull vapor from the ullage when the pressure exceeds a pressure threshold and return permeate to the tank and permit relatively VOC-free air to be released through said vent, said controller including a control routine that tracks the rate of decrease of pressure in the volatile chemical tank ullage and outputs the control signals in a fashion to cause the rate of decrease of pressure in the volatile chemical tank ullage to be less than the maximum of which the vapor extractor and vapor pump are capable, thereby reducing the pressure in the ullage.

17. An apparatus as claimed in claim 16 further comprising a discharge valve associated with said retentate outlet and wherein said controller is arranged to send a control signal to said discharge valve to open said valve to permit controlled release of relatively VOC-free air through said vent.

* * * * *